(12) United States Patent
Jackson (10) Patent No.: US 10,240,520 B2
(45) Date of Patent: Mar. 26, 2019

(54) SPLIT CYCLE ENGINE

(71) Applicant: Ricardo UK Limited, Shoreham-by-Sea, West Sussex (GB)

(72) Inventor: Neville Jackson, Shoreham-by-Sea (GB)

(73) Assignee: Ricardo UK Limited (GB)

( * ) Notice: Subject to any disclaimer, the term of this patent is extended or adjusted under 35 U.S.C. 154(b) by 0 days.

(21) Appl. No.: 15/546,844

(22) PCT Filed: Jan. 25, 2016

(86) PCT No.: PCT/GB2016/050153
§ 371 (c)(1),
(2) Date: Jul. 27, 2017

(87) PCT Pub. No.: WO2016/120598
PCT Pub. Date: Aug. 4, 2016

(65) Prior Publication Data
US 2018/0023465 A1    Jan. 25, 2018

(30) Foreign Application Priority Data
Jan. 27, 2015 (GB) .................................. 1501341.0

(51) Int. Cl.
*F02B 41/08* (2006.01)
*F02B 29/04* (2006.01)
(Continued)

(52) U.S. Cl.
CPC .......... *F02B 41/08* (2013.01); *F02B 29/0443* (2013.01); *F02B 33/20* (2013.01);
(Continued)

(58) Field of Classification Search
CPC ...... F02B 41/06; F02B 33/06; F02B 2275/32; F02B 33/38
See application file for complete search history.

(56) References Cited

U.S. PATENT DOCUMENTS

| 7,958,872 B1 * | 6/2011 | Schechter | F02M 25/03 123/568.11 |
| 2004/0123849 A1 * | 7/2004 | Bryant | F01B 7/12 123/563 |

(Continued)

FOREIGN PATENT DOCUMENTS

| DE | 3217126 A1 | 11/1983 |
| DE | 102006012036 A1 | 9/2007 |

(Continued)

OTHER PUBLICATIONS

International Search Report for Application No. PCT/GB2016/050153 dated May 11, 2016, 4 pages.

(Continued)

*Primary Examiner* — Long T Tran
(74) *Attorney, Agent, or Firm* — Lerner, David, Littenberg, Krumholz & Mentlik, LLP (57) ABSTRACT

A split-cycle engine includes a compression cylinder having a first volume for a first working fluid and a second volume for a second working fluid, the first volume and second volume being separated by the compression piston, an expansion cylinder having a first volume for the first working fluid and a second volume for the second working fluid, the first volume and second volume being separated by the expansion piston, and a fluid coupling between the second volume of the compression cylinder and the second volume of the expansion cylinder, wherein the two second volumes and the fluid coupling provide a closed volume for the second working fluid, wherein the fluid coupling includes a regenerator arranged such that the two second volumes are thermally decoupled.

20 Claims, 3 Drawing Sheets

(51) Int. Cl.
  *F02B 33/22* (2006.01)
  *F02G 1/02* (2006.01)
  *F02B 33/20* (2006.01)
  F02B 75/02 (2006.01)
  F02G 1/044 (2006.01)
  F25B 9/14 (2006.01)

(52) U.S. Cl.
  CPC ............... *F02B 33/22* (2013.01); *F02G 1/02* (2013.01); *F02B 75/02* (2013.01); *F02B 2075/025* (2013.01); *F02G 1/044* (2013.01); *F25B 9/14* (2013.01); *Y02T 10/146* (2013.01)

(56) References Cited

U.S. PATENT DOCUMENTS

| | | | |
|---|---|---|---|
| 2004/0177837 A1* | 9/2004 | Bryant | F02B 29/0412 123/559.1 |
| 2006/0137631 A1 | 6/2006 | Patton | |
| 2008/0202454 A1 | 8/2008 | Pirault | |
| 2009/0038307 A1 | 2/2009 | Smith et al. | |
| 2010/0139262 A1 | 6/2010 | Gimsa | |
| 2012/0080017 A1* | 4/2012 | Phillips | F02B 33/22 123/70 R |
| 2012/0103314 A1* | 5/2012 | Jackson | F02B 41/06 123/70 R |
| 2016/0040592 A1* | 2/2016 | Zajac | F02D 19/022 123/527 |

FOREIGN PATENT DOCUMENTS

| | | |
|---|---|---|
| WO | 2007019815 A1 | 2/2007 |
| WO | 2014135895 A1 | 9/2014 |

OTHER PUBLICATIONS

British Search Report for Application No. GB1501341.0 dated Jul. 2, 2015, 1 page.

* cited by examiner

SPLIT CYCLE ENGINE

CROSS REFERENCE TO RELATED APPLICATIONS

The present application is a national phase entry under 35 U.S.C. § 371 of International Application No. PCT/GB2016/050153, filed Jan. 25, 2016, published in English, which claims priority from Great Britain Patent Application No. 1501341.0, filed Jan. 27, 2015, the disclosures of which are incorporated by reference herein.

The invention relates to a split cycle engine.

In an internal combustion engine using the Diesel or Otto cycle, an inlet air/fuel mixture is compressed before ignition. Compression of the inlet charge causes a corresponding increase in temperature resulting from the energy input during compression. Both compression and expansion/combustion occur alternately in the same cylinder and the piston moves back and forth.

A split cycle engine is a reciprocating piston engine which is fundamentally different in that compression and combustion/expansion occur in different cylinders. Split cycle engines described herein include a compression cylinder accommodating a compression piston, an expansion cylinder accommodating an expansion piston, the compression cylinder having an inlet port for the admission of a working fluid, such as air, and an outlet port which communicates with a first path of a heat exchanger, the expansion cylinder having an inlet port, which communicates with the first path of the heat exchanger, and an outlet port which communicates with a second path of the heat exchanger, the second path being in heat exchange relationship with the first path.

Examples of such engines are described in WO 2010/067080.

Aspects and embodiments of the invention are set out in the claims.

Embodiments will now be described, by way of example, with reference to the accompanying figures, in which.

Split cycle recuperated engines have a high brake efficiency because: i) heat in the exhaust product is intercepted and redirected back into the working gas after compression, reducing the amount of fuel required to produce a given work output from the cycle; ii) quasi-isothermal compression in the compression cylinder reduces the compression work required; and iii) the expansion volume can be significantly higher than the compression volume, enabling extraction of more work from combustion gases. Compared to the Otto cycle engine, the cold (or relatively cold) fluids in compression side of the system are separated from the hot expansion cylinder by a recuperator. This means that the expansion cylinder may be maintained at a higher temperature than in the Otto cycle engine. However, as the temperature of the expansion cylinder is higher, so the amount of heat loss to atmosphere is greater. Heat loss from the expansion cylinder may be via exhaust waste or conduction through the cylinder wall, for example, into the engine coolant and to air flow circulating in the cylinder block as the pistons go up and down. This heat loss is a source of inefficiency.

Embodiments of the present invention provide a split cycle engine, particularly for automotive use, which overcomes, reduces or mitigates at least some of the problems referred to above.

As described herein, a method of operating a split cycle engine includes injecting a liquid-phase coolant into the compression cylinder, where the coolant has the property of only being a liquid at low or cryogenic temperatures, after or during intake of the first working fluid, so that the coolant boils from its liquid phase to its gas phase in the compression cylinder and passes, with the working fluid, into and the expansion cylinder. The coolant may be liquid nitrogen, for example. As the coolant boils it absorbs heat that is produced as a result of the compression so that the compression is at least quasi-isothermal. Due to the fact there is no substantial increase in temperature, the work required to perform the compression is substantially reduced. The cooled compressed working fluid then flows through the outlet port of the compression cylinder into the first path of the heat exchanger, or recuperator, in which it is heated to a substantial temperature before flowing into the expansion cylinder. Fuel, typically diesel fuel or natural gas, is then injected into the heated compressed working fluid and burnt. Combustion of the fuel/working fluid mixture drives the power stroke of the working piston to produce torque. Following combustion, the exhaust valve of the expansion cylinder is opened and the hot exhaust product is released from the expansion cylinder and directed through the heat exchanger, thus providing the heat source that increases the temperature of the high pressure working fluid supplied to the expansion cylinder. Thus, the two pistons effectively operate in two stroke mode and this, coupled with substantially isothermal compression and exhaust heat energy recovery, means that the engine has a high brake thermal efficiency.

In embodiments, a split cycle engine comprises a second working fluid system including a regenerator arranged between the cold compression cylinder and the hot expansion cylinder. As described herein, the second working fluid system is arranged to capture heat which would otherwise be dissipated (for example, in lost exhaust gases and by conduction through the expansion cylinder wall or expansion piston or through exhaust blowby) and to use it to increase the net torque produced by the engine.

In embodiments, a second working fluid system including a regenerator is provided between non-working (obverse) faces of the compression piston and the expansion piston such that second working fluid in the second working fluid system supplies work which powers reciprocating movement of the pistons.

In embodiments, the flow of exhaust gas (exhaust product) is managed to ensure that exhaust heat that cannot usefully be used in the recuperator it is diverted to a hot-side of the second working fluid system and so harnessed to create torque.

In general, the coolant is a non-oxidizing, non-combustible fluid. In embodiments, the coolant is a non-oxidizing, non-combustible cryogenic fluid. The term cryogenic fluid as used herein refers to a fluid which occupies its gaseous phase at standard temperature and pressure and which must be cooled to a low, that is to say cryogenic, temperature in order to occupy its liquid phase. In embodiments, the coolant is injected into the compression cylinder in its liquid phase, i.e. as a liquid. In embodiments, a temperature- and pressure-controlled coolant reservoir is provided for holding the coolant at a low temperature and optionally a high pressure in order to maintain the coolant in its liquid phase prior to injection into the compression cylinder. Whilst the coolant may be an inert gas such as helium or argon it is preferred that nitrogen is used, particularly as it is readily available from the atmosphere.

Figure 1:
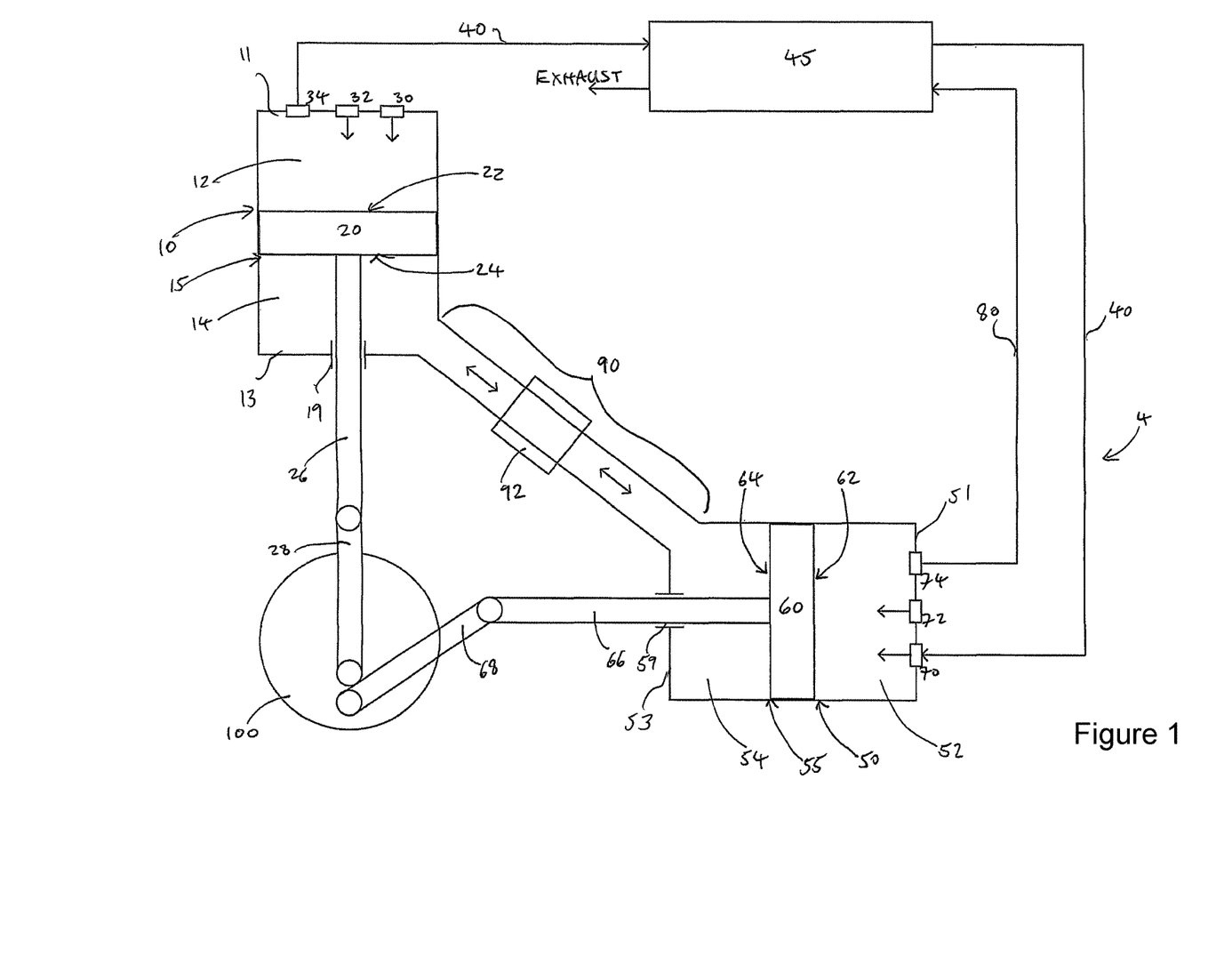
FIG. 1 shows a split cycle engine.

FIG. 1 shows an example of a split cycle engine 4. The split cycle engine 4 comprises a compression cylinder 10, a first working fluid pathway 40, an expansion cylinder 50, an exhaust pathway 80, a second working fluid coupling 90 and a crank 100. The first working fluid pathway 40 and the exhaust pathway 80 comprise (pass though) a recuperator 45, which is arranged to provide a thermal coupling between the first working fluid pathway 40 and the exhaust pathway 80. The second working fluid coupling 90 comprises (passes through) a regenerator 92.

The first working fluid pathway 40 fluidically couples a first volume 12 of the compression cylinder to a first volume 52 of the expansion cylinder via the recuperator 45. The exhaust pathway fluidically couples the first volume 52 of the expansion cylinder to atmosphere ("exhaust" in FIG. 1) via the recuperator 45. The second working fluid coupling 90 fluidically couples the second volume 14 of the compression cylinder to the second volume 54 of the expansion cylinder via the regenerator 92.

The compression piston 20 and the expansion piston 50 are each coupled to the crank 100, which is provided on a crankshaft (not shown). The arrangement is such that in use the crank 100 couples the reciprocating (linear) motion of the two pistons compression pistons in a fixed phase relationship and translates the reciprocating motion of the pistons into rotational motion in the crankshaft.

The compression cylinder 10 comprises an inlet port 30, a coolant admission port 32, an outlet port 34 and a compression piston 20.

The inlet port 30 is arranged to admit a first working fluid into the first volume 12 of the compression cylinder 10. The coolant admission port 32 is arranged to admit a coolant into the first volume 12 of the compression cylinder 10. The outlet valve 34 is arranged to permit the exit of the first working fluid (and coolant) from the first volume 12 of the compression cylinder 10. (Although fluid exiting the outlet port may comprise coolant, which in use mixes with the first working fluid during compression, for simplicity the mixture will simply be referred to herein as the first working fluid.)

The compression piston 20 is arranged within the compression cylinder 10 such that the piston divides the internal volume of the compression cylinder into the first volume 12 and the second volume 14 and separates the first volume 12 from the second volume 14. The compression piston 20 is arranged for linear movement towards and away from the ports 30, 32, 34, wherein movement towards the ports reduces the first volume 12 and increases the second volume 14 in direct proportion to the reduction of the first volume. Similarly, movement of the compression piston 20 away from the ports 30, 32, 34 increases the first volume 12 and reduces the second volume 14 in direct proportion to the increase of the first volume 12. An inner surface of the compression cylinder 10 provides a sliding surface 15 against which the compression cylinder 20 moves. One or more lubricant pathways (not shown) are provided through the cylinder wall to provide lubricant, from a lubricant reservoir, to the sliding surface 15.

The expansion cylinder 50 comprises an inlet port 70, a fuel admission port 72, an outlet port 74 and an expansion piston 60.

The inlet port 70 is arranged to admit compressed first working fluid into the first volume 52 of the expansion cylinder 50. The fuel admission port 72 is arranged to admit a fuel into the first volume 52 of the expansion cylinder 50. The outlet port 74 is arranged to permit the exit of an exhaust product from the first volume 52 of the expansion cylinder 50.

The expansion piston 60 is arranged within the expansion cylinder 50 such that the piston divides the internal volume of the expansion cylinder 50 into the first volume 52 and the second volume 54 and separates the first volume 52 from the and second volume 54. The expansion piston 60 is arranged for linear movement towards and away from the ports 70, 72, 74, wherein movement towards the ports reduces the first volume 52 and increases the second volume 54 in direct proportion to the reduction of the first volume. Similarly, movement of the expansion piston 60 away from the ports 70, 72, 74 increases the first volume 52 and reduces the second volume 54 in direct proportion to the increase of the first volume 52. An inner surface of the expansion cylinder 50 provides a sliding surface 55 against which the expansion cylinder 50 moves. One or more lubricant pathways (not shown) are provided through the cylinder wall to provide lubricant, from a lubricant reservoir, to the sliding surface 55.

The second working fluid coupling 90 extends between and fluidically couples the second volume 14 of the compression cylinder 10 and the second volume 54 of the expansion cylinder 50. The second working fluid coupling 90 passes through the regenerator 92.

The compression cylinder 10 comprises a durable, heat-resistant and inert material, such as steel. The compression cylinder 10 has an elongate circumferential wall and two end walls 11, 13 each closing a respective end of the circumferential wall. A first of the end walls 11 includes the inlet and outlet ports 30, 34 and, in the illustrated example, the coolant admission port 32. In other examples, one or more coolant admission ports are provided in the first end wall 11 and/or in the sidewall (circumferential wall) of the compression cylinder 10. As another possibility, one or more of the ports 32, 34 is provided through the compression cylinder sidewall near the first end wall 11.

The compression piston 20 comprises a generally cylindrical body with an obverse face 22 and a reverse face 24. The obverse, or working, face 22 is the face which faces towards the ports 30, 32, 34 and which transfers the work to the first working fluid and coolant contained in the first working volume 12 during the compression stroke. The first volume 12 is at any given time defined by the volume enclosed by the first end wall 11, the obverse face 22 of the compression piston 20 and the length of the circumferential intermediate the first end wall 11 and the obverse face 22 at that point in time. The reverse face 24, on the opposite side of the piston 20 to the obverse face 22, faces generally away from the ports 30, 32, 34 and is the face in contact with the second fluid contained in the second volume 14. The second volume 12 is at any given time defined by the volume enclosed by the second end wall 13, the reverse face 24 of the compression piston 20 and the length of the circumferential intermediate the second end wall 13 and the reverse face 24 at that point in time.

The circumferential surface of the piston 20 carries one or more piston rings which are arranged to form a seal between the compression piston 20 and the circumferential wall of the compression cylinder 10. The seal mitigates fluid leakage fluid leakage from the first volume 12 into the second volume 14 and vice versa, whilst permitting reciprocating movement of the compression piston 20 within the compression cylinder 10. The seal helps to maintain the efficiency of the compression stroke and helps to maintain the mass of fluid and the purity of the fluid in the second volume 14. The piston rings are provided with lubrication to reduce frictional drag.

In general, the term "seal" when used herein refers to a fit between two surfaces, or to a surface or element arranged to form a fit with another surface or element such that little to no fluid is able to pass between the two surfaces or elements.

The second volume 14 includes an aperture 19. A piston rod 26 extends from the compression piston 20 through the aperture 19 and mechanically couples the piston 20 to the crank 100 via a pivotal coupling to a connecting rod 28. The piston rod 26 is non-pivotally connected to the piston 20 such that the axis of the piston rod 26 remains aligned with the direction of axis of the reciprocating movement of the piston 20. This means that the piston rod 26 does not oscillate radially within the aperture. A seal is provided between the piston rod 26 and the aperture 19 to mitigate fluid leakage from or into the second volume 14 through the aperture 19. The seal is provided on the aperture 19. As another possibility, the seal may be provided on the piston rod 26 or by surfaces of the piston rod 26 and the aperture 19. The seal is provided with lubricant to reduce frictional drag. One or more lubricant injection ports or pathways or nozzles may be provided through the compression cylinder wall or around the aperture 19 for dosing lubricant onto the aperture seal.

The coolant admission port 32 comprises one or more injection nozzles arranged to spray liquid coolant, for example liquid nitrogen, into the first volume 12 of the compression cylinder 10. The one or more nozzles are in fluidic communication with a coolant reservoir (not shown). The coolant reservoir is arranged to provide a low-temperature, high-pressure environment to maintain the coolant in a liquid state.

The inlet port 30 comprises a controllable valve. The controllable valve is in fluidic communication with a supply of first working fluid. Typically the first working fluid comprises air which is cooled and raised to a high pressure by a turbocharger before being provided to the inlet port.

The outlet port 34 comprises an outlet valve. Due to the high pressure changes occurring within the compression cylinder, the outlet valve is a pressure-compensated valve which is arranged to open in response to a pressure increase within the first volume but to regulate the rate of outflow of fluid from the first volume.

The expansion cylinder 50 comprises a durable, heat-resistant and inert material, such as steel. The expansion cylinder 50 has an elongate circumferential wall and two end walls 51, 53 each closing a respective end of the circumferential wall. A first of the end walls 51 includes the inlet port 70, the fuel admission port 72 and the outlet port 74. As another possibility, one or more of the ports 70, 72, 74 is provided through the expansion cylinder sidewall near the first end wall 51.

The expansion piston 60 comprises a generally cylindrical body with an obverse face 62 and a reverse face 64. The obverse, or working, face 62 is the face which faces towards the ports 70, 72, 74 and the face to which force is applied by the first working fluid/fuel mixture as it combusts and expands during the expansion stroke. The first volume 52 is at any given time defined by the volume enclosed by the first end wall 51, the obverse face 62 of the compression piston 60 and the length of the circumferential intermediate the first end wall 51 and the obverse face 62 at that point in time. The reverse face 64, on the opposite side of the piston 60 to the obverse face 62, faces generally away from the ports 70, 72, 74 and is the face in contact with the second fluid contained in the second volume 14. The second volume 52 is at any given time defined by the volume enclosed by the second end wall 53, the reverse face 64 of the compression piston 60 and the length of the circumferential intermediate the second end wall 53 and the reverse face 64 at that point in time.

The circumferential surface of the expansion piston 60 carries one or more piston rings which are arranged to form a seal between the expansion piston 60 and the circumferential wall of the expansion cylinder 50. The seal mitigates fluid leakage from the first volume 52 into the second volume 54 and vice versa, whilst permitting the necessary reciprocating movement of the compression piston 60 within the compression cylinder 50. The seal helps to maintain the efficiency of the expansion stroke and helps to maintain the mass of fluid and the purity of the fluid in the second volume 54. The piston rings are provided with lubrication to reduce frictional drag. Means may be provided for managing the temperature and therefore the viscosity of the lubricant. Some examples are described in relation to FIG. 2.

The second volume 54 includes an aperture 59. A piston rod 66 extends from the expansion piston 60 through the aperture 59 and mechanically couples the expansion piston 60 to the crank 100 via a pivotal coupling to a connecting rod 68. The piston rod 66 is non-pivotally connected to the piston 60 such that the axis of the piston rod 66 remains aligned with the direction of axis of the reciprocating movement of the expansion piston 60. This means that the piston rod 66 does not oscillate radially within the aperture 59. A seal is provided between the piston rod 66 and the aperture 59 to mitigate fluid leakage from or into the second volume 54 through the aperture 59. The seal is provided on the aperture 59. As another possibility, the seal may be provided on the piston rod 56 or by surfaces of the piston rod 56 and the aperture 59. The seal is provided with lubricant to reduce frictional drag. One or more lubricant injection ports or pathways or nozzles may be provided through the compression cylinder wall or around the aperture 59 for dosing lubricant onto the aperture seal.

The inlet port 70 of the expansion cylinder 50 comprises a controllable valve which is arranged in fluidic communication with the first working fluid pathway 40 on one side and with the first volume 52 of the expansion cylinder 50 on the other side. The valve is a pressure-compensated valve.

The fuel admission port 54 comprises a fuel injector arranged in fluidic communication with a fuel reservoir and controllable to inject fuel into the first volume 52 of the expansion cylinder 50.

The outlet port 74 of the expansion cylinder 50 comprises an outlet valve which is arranged in fluidic communication with the first volume 52 of the expansion cylinder 50 on the other side and with the exhaust pathway 80 on the other side. The valve is controllable to allow in exhaust product of the combustion to exit the first volume 52 into the exhaust pathway 80.

The first fluid pathway 40 and the exhaust pathway 80 are provided by heat resistant, non-reactive conduits.

The recuperator 45 provides a counter-flow energy recovery heat exchanger comprising a first fluid path forming part of the first working fluid pathway and a second fluid path forming part of the exhaust pathway. In use, first working fluid flows in a first direction (towards the expansion cylinder) through the first fluid path of the recuperator 45 and the exhaust product flows in a second direction opposite to the first direction (away from the expansion cylinder) through second fluid path of the recuperator 45. The first and second fluid paths are arranged in thermal communication so that in use heat is transferred from the hot exhaust product flowing in the second fluid path into the cold first working fluid flowing in the first fluid path.

The second working fluid coupling 90 comprises a heat resistant, non-reactive conduit. The volume of the second working fluid coupling 90 is small compared to each of the second volumes 12, 52 so that the size of the second volumes 12, 52 is a relatively large proportion of the total volume of the second working fluid closed volume, so that an increase or decrease in the volume of one of the second volumes causes a non-negligible effect on the pressure or temperature of the second working fluid present in the second volume. That is, the second working fluid cannot avoid the effect of the volume change by displacement into the second working fluid coupling.

The regenerator 92 is a heat exchanger having a fluid path in thermal communication with a heat storage medium arranged such that the heat storage medium: i) absorbs heat from fluid entering from the hot (expansion/combustion) side so that cold fluid passes out into the other (cold) side of the regenerator 92; and 2) provides heat to fluid entering from the cold (compression) side so that hot fluid passes out into the other (hot) side of the regenerator 92. The regenerator 92 thereby acts as a thermal barrier between the hot expansion side and the cold compression side, maintaining the thermal gradient therebetween. This means that the second volume 54 of the expansion cylinder 50 is kept hot while and the second volume 14 of the compression cylinder 54 is kept cold even whilst the second working fluid moves between them, as it does so providing work to the pistons.

In other words, the regenerator 92 is arranged such that the two second volumes are thermally decoupled, meaning that there is not a direct thermal relationship between them so that the thermal gradient between them is preserved. In practice, the two second volumes may be considered thermally independent.

The regenerator 92 may be arranged at a midpoint of the fluid coupling.

The compression cylinder second volume 14, the expansion cylinder second volume 54 and the second working fluid coupling 90 (including the regenerator 92 and the second working fluid contained in the volumes and the regenerator 92) provide a second working fluid system. The second working fluid system is a closed system, in which the second working fluid is contained within the volume defined by the two second volumes 14, 54 and the fluid coupling 90 so that its mass remains constant. In general, due to the practical reality of fluid leakage through joins or seals in the system, the system will not be perfectly closed, and the term "closed" as used herein generally refers to a system or volume which is not in fluidic communication with an outside space, although there may be a small degree of fluid leakage.

The crank 100 may be provided on or form part of a crankshaft as known in the art. In the illustrated example, the compression and expansion pistons 20, 60 are coupled to the same crank 100 but in other examples they may be coupled to different cranks which are provided on the same crankshaft or on connected crankshaft portions. In the illustrated example, the pistons 20, 60 are coupled to the piston rods 26, 66 which do not rotate or pivot with respect to the pistons, and the pivoting couplings which enable translation between linear and rotational motion are provided between the piston rods 26, 66 and the connecting rods 28, 68 which connect directly to the crank 100. In other examples, the pivoting coupling could be provided by the coupling of the piston rods to the pistons. In such examples, it will be appreciated that a larger aperture will be provided through the respective cylinder walls to accommodate the reciprocating, pivoting movement of the piston rod and an appropriate sealing arrangement will be provided around the volume traced out by the reciprocating, pivoting piston rod.

In operation, first working fluid is admitted through the inlet port 30 into the first volume 12 of the compression cylinder 10 as the compression piston 20 moves away from the compression cylinder ports 30, 32, 34. Following closure of the inlet port 30, cold liquid coolant is injected through the coolant admission port 32 from the coolant reservoir (not shown) where it is maintained in its liquid phase at low temperature. After completing its maximum traverse away from the ports 30, 32, 34, the direction of the compression piston 20 reverses and it begins travelling towards the ports 30, 31, 34. As it does so, the volume of the first volume 12 is reduced and the first working fluid contained therein is compressed. This is referred to as the engine's compression stroke. Compression work done by the compression piston 20 is transferred from the obverse face 22 of the compression piston 20 into the first working fluid as heat energy, at least some of which is absorbed by the coolant. Since the coolant is a cryogenic liquid, the absorbed heat acts to change the phase of the coolant from liquid to gas rather than causing an increase in temperature. The first working fluid therefore remains cold at the end of the compression stroke. Since the wall of the compression cylinder 10 is thermally conductive, the addition of the coolant also acts to cool the compression cylinder 10 itself. Thermal conduction along the cylinder wall means that the second volume 14 is cooled as well as the first volume 12. This has a cooling effect on the second working fluid contained in the second volume 14.

Figure 3:
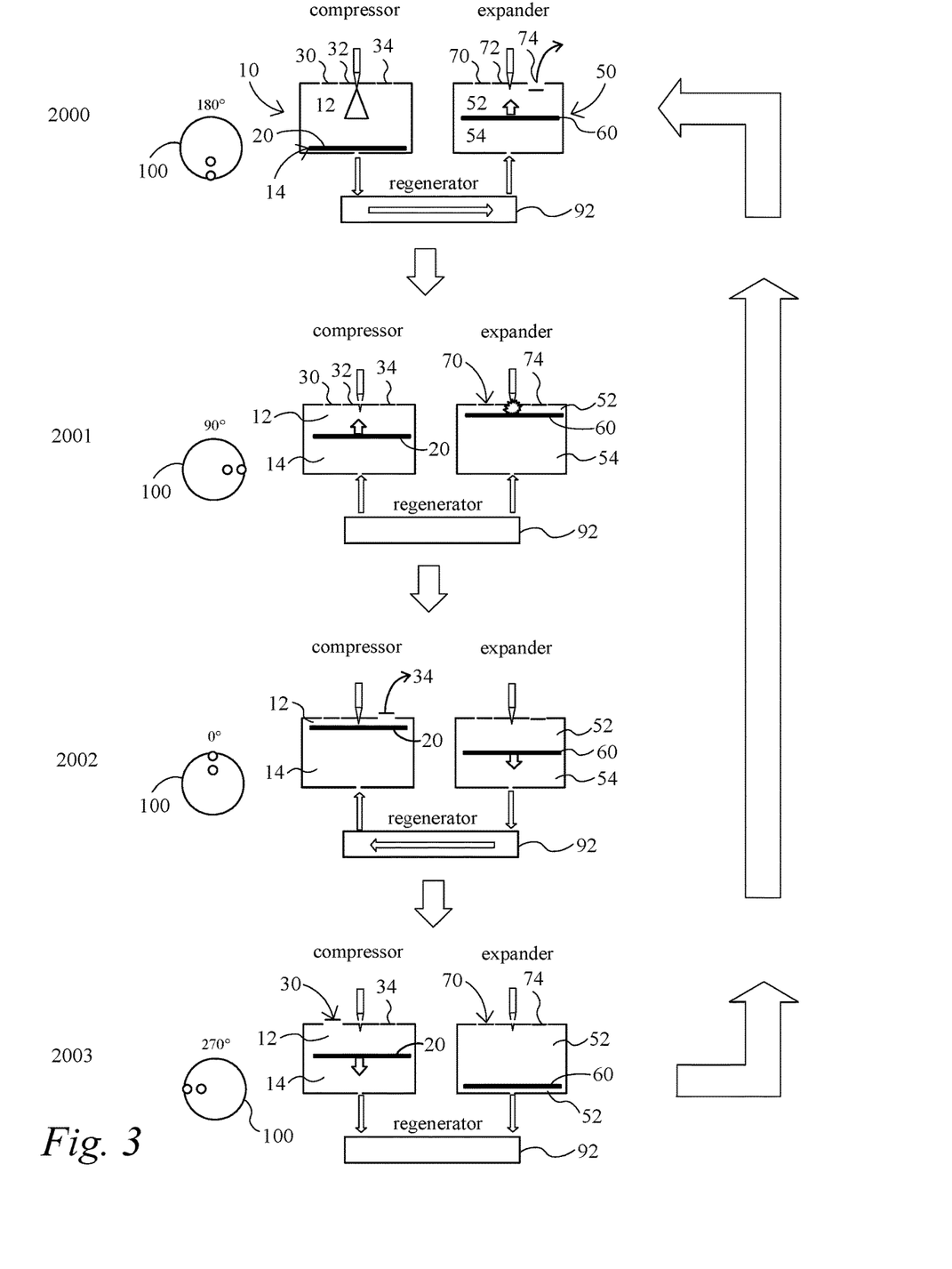
FIG. 3 shows an example of stages in an engine cycle of a split cycle engine.

Upon completion of the compression stroke, the outlet port 32 is opened, allowing the cold compressed first working fluid to flow into the first fluid pathway 40 and through the first fluid path of the recuperator 45. From the recuperator 45, the first working fluid is provided to the inlet port 70 of the expansion cylinder 50. The first working fluid is admitted through the inlet port 70 into the first volume 52. Fuel is injected into the first volume 52 through the fuel admission port 72 and at some point before or during this process, the inlet port 30 is closed. The admission of first working fluid and fuel occurs when the expansion piston is at or near its minimum separation from the expansion cylinder ports 70, 72, 74 (top dead centre), i.e. when the first volume 52 is at its minimum. The fuel/first working fluid mixture combusts. The combusting mixture expands and drives the expansion piston 60 away from the ports 70, 72, 74. This is the engine's expansion or power stroke. During the expansion stroke, the expansion piston 60 transfers torque to the crank 100 via the piston rod 66 and the connecting rod 68. Some of the torque is extracted as the useful output of the engine (in the automotive example, to propel the vehicle) but some is used to drive the compression piston 20. Examples of relative phasing of the expansion piston and compression piston are shown in FIG. 3.

After completion of the expansion stroke, that is to say when the expansion piston 60 has completed its full traverse away from the ports 70, 72, 74, the exhaust outlet 74 is opened, allowing the hot exhaust product of combustion to exit the expansion cylinder first volume 52. The exhaust product flows into the exhaust pathway 80 and through the second fluid path of the recuperator 45. In the recuperator 45, the exhaust product flows through the second fluid path in the opposite direction as the first working fluid flowing through the first path. Heat is transferred from the exhaust product to the first working fluid. The expansion piston travels back towards the ports 70, 72, 74 in advance the next expansion stroke. This may be referred to as a recovery stroke. Force used to drive the recovery stroke is provided by the crank 100.

The phase between the compression piston 20 and the expansion piston 60 should be such as to cause work to be done by the second working fluid in response to the movement of the pistons 20, 60. As described herein, the compression piston 20 will be arranged to lead.

In arrangements where the compression piston 20 leads the expansion piston by a phase angle of greater than 180° and less than 360°, for example by 270°, the work generated in the second working fluid may assist the movement of the pistons 20, 60.

It will be appreciated that on engine start-up, no exhaust product flows in the exhaust pathway 80 and that several engine cycles must be completed before enough hot exhaust product is available to provide a significant source of heat in the recuperator 45. Once the engine 4 has warmed up, a significant amount of heat may be extracted from the exhaust product by the first working fluid in the recuperator 45, significantly increasing the temperature of the first working fluid. The first working fluid is supplied to the inlet port 70 of the expansion cylinder 50 at substantially the same (high) temperature at which it exits the recuperator 45. By providing the first working fluid to the expansion cylinder 50 hot, combustion is made more efficient.

Since the wall of the expansion cylinder 50 is thermally conductive, the hot input to the first volume 52 heats the cylinder wall. Because the circumferential wall is common to the first and second volumes 52, 54 and because it is thermally conductive, the second volume 54 is heated as well as the first volume 52. This has a heating effect on the second working fluid contained in the second volume 54.

Meanwhile in the second volumes 14, 54 of the two cylinders, volume changes have been occurring in an inverse manner to those occurring in the respective first volumes 12, 52. That is, during the compression stroke in which the first volume 12 of the compression cylinder 10 decreases, the second volume 14 increases, whilst during the expansion stroke in which the first volume 52 of the compression cylinder 50 increases, the second volume 54 decreases. The second volumes in 14 and 54 are increased and decreased by the actions of the pistons 20 and 60 which are connected to the crank mechanism 100. The phasing of the piston motion is arranged to enable the total volume of the second working fluid to increase and decrease. Heat is added when the total volume is at a minimum and heat is extracted when the total volume is at a maximum. Heat addition causes the pressure of the second working fluid to increase and heat extraction from the second volume causes the pressure to decrease. The phasing of the pistons 20 and 60 is arranged such that an increase in the pressure of the second working fluid occurs when the total second volume is increasing and the pressure reduces when the total second volume is decreasing. The fluctuating pressure and volume results in work being extracted from the second working fluid.

In an idealized model, the second volumes 14, 54 of the two cylinders and the fluid coupling 90 would together define a perfectly closed volume which contains the second working fluid, meaning there is no fluid leakage into or out of the volume and the mass of the second working fluid contained in the volume remains constant. As noted, in practice, the system will not be perfectly closed as some fluid leakage may occur around the seals with the piston rods 26, 66 and around the piston rings. Leakage may be mitigated by management of the seals and piston rings, for example ensuring adequate lubrication of the seals and piston rings and/or of the sliding surfaces 18, 58. In the idealized model, which assumes no fluid leakage, the thermodynamic processes occurring in the second working fluid may be described as those of a Stirling cycle.

It will be appreciated that maintenance of a temperature difference, or gradient, between the (hot) expansion side of the second working fluid coupling and the (cold) compression side of the second working fluid coupling establishes a cycle in the second working fluid from which work may be extracted. In general, the greater the temperature difference between the hot side and the cold side, the more effective the cycle and the greater the amount of the amount of work.

Figure 2:
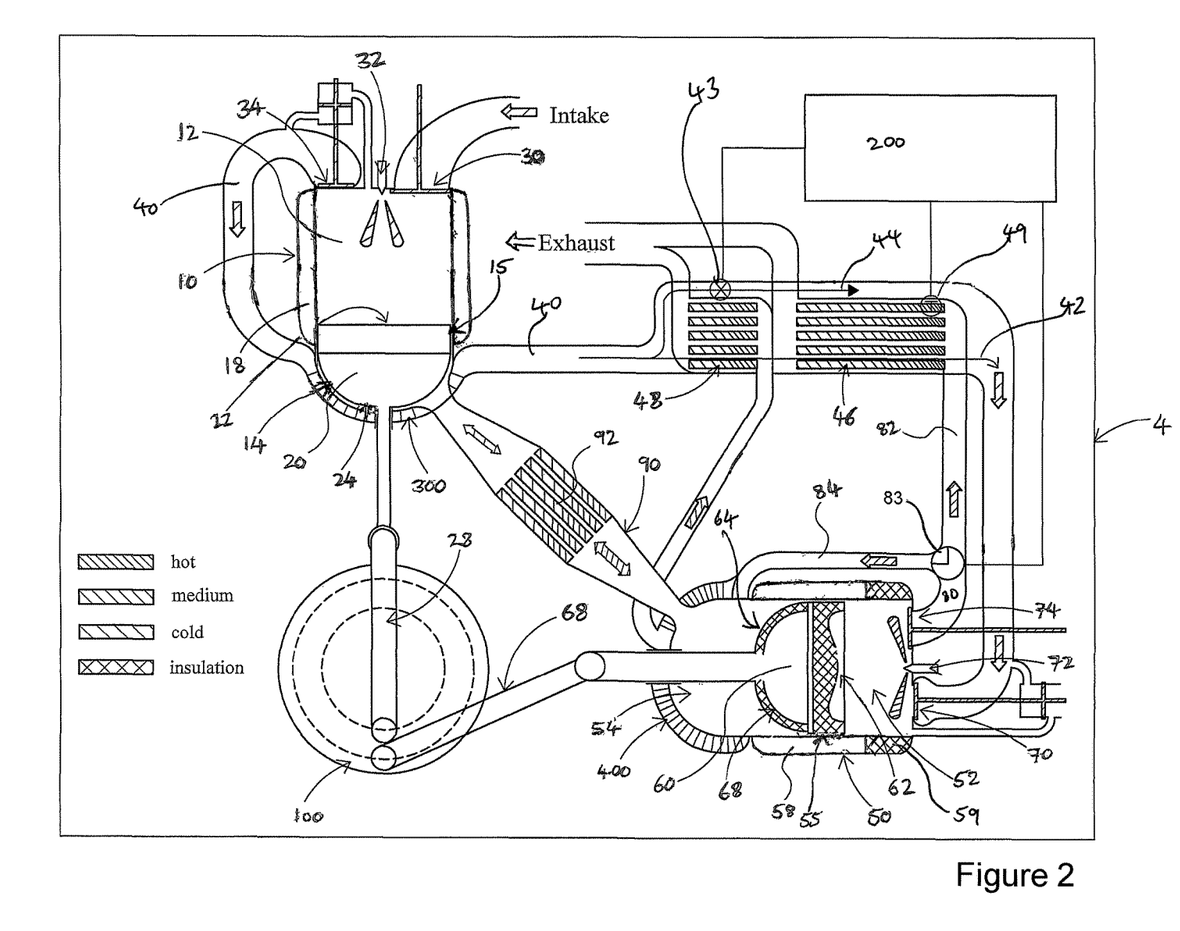
FIG. 2 shows a split cycle engine with additional thermal management features.

FIG. 2 shows an example of a split cycle engine 4 including further heat management features. In FIG. 2, relative temperatures of different parts of the split cycle engine 4 are indicated by hatching, where higher temperatures are indicated by more dense hatching (more closely spaced lines). Thermal insulation is represented by cross-hatching.

In addition to the features of FIG. 1, the split cycle engine of FIG. 2 comprises a cold-side heat exchanger 300 and a hot-side heat exchanger 400. The cold-side heat exchanger 300 is arranged in thermal communication with the second volume 14 of the compression cylinder 10. The hot-side heat exchanger 400 is arranged in thermal communication with the second volume of the expansion cylinder. The recuperator 45 comprises a primary recuperator 46 and a secondary recuperator 48. The compression cylinder 10 and the expansion cylinder 50 are each provided with a thermal jacket 18, 58. The expansion cylinder 50 is also provided with a thermally insulative coating 59. The expansion piston 60 is provided with a thermally insulative coating 68.

The thermal jacket 18 of the compression cylinder 10 is arranged around an outer surface of the compression cylinder 10 to reduce heating of the compression cylinder 10. In an example, the thermal jacket 18 comprises a thermally insulative material arranged to limit heat conduction into the cylinder. In another example, the thermal jacket comprises a fluid sleeve in which a fluid may be circulated to remove heat from the surface of the compression cylinder 10. Means for managing the temperature of the thermal jacket 18 may be provided.

The thermal jacket 58 of the expansion cylinder 50 is arranged around a portion of the outer surface of the expansion cylinder 10 near the sliding surface 55 to control the temperature of the expansion cylinder wall in the region of the sliding surface 55. The insulative coating 59 is provided around a portion of the outer surface of the expansion cylinder 10 near the ports 70, 72, 74 to limit heat loss from the port-end (the combustion end) of the first volume 52.

In an example, the thermal jacket 58 comprises a thermally insulative material arranged to limit heat conduction out of the expansion cylinder wall to keep the expansion cylinder 50 hot. In another example, the thermal jacket comprises a sleeve containing a fluid whose temperature may be managed to control the temperature of the cylinder wall in the region of the sliding surface 55. Means for managing the temperature of the thermal jacket 18 may be provided.

Poor lubricant performance may reduce the efficiency of the engine. A given lubricant will generally have a working temperature range in which its viscosity is within a preferred range to allow acceptably smooth movement of the piston 20, 60 on the sliding surface 15, 55. If the lubricant becomes too cold, it may become too viscous and increase drag on the piston, too hot and it may dry out and provide reduced lubrication. Means may therefore be provided for managing the temperature of the thermal jackets 18, 58 to keep the sliding surfaces 15, 55 at temperatures which allow acceptable lubricant performance. This may involve adding or removing heat from the surface of either cylinder 10, 50 as appropriate. Additionally or alternatively, lubricant performance may be controlled by managing an injection temperature and rate of lubricant injection. Heat from the hot-side of the engine may be coupled to a lubricant injection system for the compression piston 20 to prevent the lubricant from getting too cold. A cold environment or fluid from the cold-side of the engine may be coupled to a lubricant injection system for the expansion piston 50 to prevent the lubricant from getting too hot.

The outlet port 34 of the compression cylinder 10 is fluidically coupled to an inlet of the cold-side heat exchanger 300. An outlet of the cold-side heat exchanger 300 is fluidically coupled to an inlet of the secondary recuperator 48. An outlet of the secondary recuperator 48 is fluidically coupled to an inlet of the primary recuperator 46. An outlet of the primary recuperator 46 is fluidically coupled to the inlet port of the expansion cylinder 50. The fluidic couplings are provided by the first working fluid pathway 40 which extends through, sequentially, the cold-side heat exchanger 300, the secondary recuperator 48 and the primary recuperator 46 before coupling to inlet port of the expansion cylinder 50.

The first fluid pathway 40 comprises a heat exchange pathway 42 which passes through the recuperator 45 and a bypass pathway 44 which bypasses the recuperator 45. The first fluid pathway 40 bifurcates into the heat exchange pathway 42 and the bypass pathway 44 ahead of (upstream of) the inlet of the secondary recuperator 46 and recombines after (downstream of) a first fluid outlet of the primary recuperator 48.

The bypass pathway 44 has a valve 43 for controlling the flow of compressed primary fluid into the bypass pathway 44. The valve 43 is arranged to be controlled by a controller 200.

A temperature sensor 49 is arranged at or near the outlet of the primary recuperator 48 to sense the temperature of the first working fluid exiting the recuperator 45. The temperature sensor 49 is coupled to the controller 200.

The exhaust pathway 80 comprises a primary exhaust pathway 82 and a secondary exhaust pathway 84. The exhaust pathway 80 bifurcates into the primary exhaust pathway 82 and a secondary exhaust pathway 84. The primary exhaust pathway 82 extends from the bifurcation to atmosphere via the primary recuperator 48. The secondary exhaust pathway 84 extends from the bifurcation through the hot-side heat exchanger 400, from the hot-side heat exchanger 400 through an exhaust path of the secondary recuperator 47 and from the secondary recuperator to atmosphere.

A valve 83 is provided at the exhaust pathway bifurcation to control the flow of the exhaust product into the primary exhaust pathway 82 and the secondary exhaust pathway 84. The valve 83 is arranged to be controlled by the controller 200.

The cold-side heat exchanger 300 comprises a fluid conduit which is arranged in thermal communication with a thermally conductive surface of the second volume 14 of the compression cylinder 10. The conduit may be provided in a coiled configuration across the surface of the second volume 14 or otherwise be arranged to thermally communicate with an extended surface area of the second volume 14. For example, the conduit may be arranged to extend across at least a portion of the second end wall 13 of the compression cylinder 10 and/or the circumferential wall adjacent the second end wall 13. In use, the cold-side heat exchanger 300 carries cold compressed fluid which has exited the first volume 12 of the compression cylinder 10 across the thermally conductive surface of the second volume 14 to remove heat from the second volume 14.

In another example, the cold-side heat exchanger 300 is arranged to receive coolant from the coolant reservoir additionally or alternatively to receiving first working fluid from the outlet port 34 of the compression cylinder 10.

Similarly, the hot-side heat exchanger 400 comprises a fluid conduit which is arranged in thermal communication with a thermally conductive surface of the second volume 54 of the expansion cylinder 50. The conduit may be provided in a coiled configuration across the surface of the second volume 54 or otherwise be arranged to communicate thermally with an extended surface area of the second volume 54. For example, the conduit may be arranged to extend across at least a portion of the second end wall 53 of the expansion cylinder 50 and/or the circumferential wall adjacent the second end wall 53. In use, the hot-side heat exchanger 300 carries hot exhaust product which has exited the first volume 52 of the expansion cylinder 50 across the thermally conductive surface of the second volume 54 to add heat to the second volume 54.

The primary recuperator 46 is functionally the same or similar to the recuperator described in relation to FIG. 1, and may have the same, or substantially the same, structure.

The secondary recuperator 48 is functionally the same or similar to the primary recuperator 46 and may have the same, or substantially the same, structure. The purpose of the secondary recuperator is to transfer residual heat from exhaust product which has passed through the hot-side heat exchanger into the primary working fluid.

The length or configuration of the fluid paths through any of the recuperators or heat exchangers described herein may be selected in view of operational data such as operational temperature and/pressure ranges at the input and output sides of the recuperator or heat exchanger.

The controller 200 may be provided by or form part of the engine management system of the engine or it may be provided by a separate controller. The controller 200 may be provided by a programmed programmable computer, for example.

The temperature sensor 49 may comprise any appropriate sensor such as a thermocouple. In the illustrated example, the temperature sensor 49 is provided at or near the outlet of the primary recuperator to sense the temperature of the first working fluid exiting the recuperator 45 and being provided to the expansion cylinder 50. In other examples, the temperature sensor 49 could be provided at or near the input port 70 of the expansion cylinder 50 or on or near the first fluid pathway 40 between the recuperator 45 and the inlet port 70. In other examples, a plurality of sensors could be provided at one or more locations within the engine.

The (bypass) valve 43 comprises a selectively openable valve. When open, first working fluid may flow towards the expansion cylinder 50 through the bypass pathway 44 instead or as well as flowing through the heat exchange pathway 42. When closed, all of the first working fluid must flow to the expansion cylinder 50 through the heat exchange pathway 42.

The (exhaust) valve 83 comprises a controllable valve which is configured to permit fluidic communication between the exhaust port 74 of the expansion cylinder 50 and one or both of the primary exhaust pathway 82 and the secondary exhaust pathway 84. In the illustrated example, the valve 83 comprises a rotatable blocking element which may be rotated into alignment with one of the primary exhaust pathway 82 and the secondary exhaust pathway 84, but not both, to block that pathway, or out of alignment with both pathways to leave both open. In other examples, another valve type may be provided.

The thermally insulative coating 18 of the compression cylinder 10 is arranged over the outer circumferential surface of the cylinder wall to reduce heat transfer across the cylinder wall to maintain the low temperature of at least the first volume. The thermally insulative coating may comprise. The thermally insulative coating 58 of the expansion cylinder may be similarly provided to maintain the high temperature of at least the first volume 52 of the expansion cylinder 50.

The thermally insulative coatings 18, 58 also promote heat conduction along the respective cylinder wall, which may tend to bring the temperatures of the respective second volumes 14, 54 towards temperatures of the respective first volumes 12, 52. For example, in the hot cylinder, the effect of increased thermal conduction from the first volume 52 to the second volume 54 is that heat in the first volume 52 that might otherwise be lost to atmosphere is transferred into the second volume 54 and heats the second volume 54. This supports the maintenance of the temperature gradient across the second working fluid coupling 90.

The thermally insulative coating 68 on the expansion piston 60 is arranged to reduce the removal of heat from the first volume 52 through the expansion piston 60. This promotes maintenance of the high temperature environment in the first volume 52 which is needed for effective and efficient combustion. In the illustrated example, the thermally insulative coating 68 is provided on the obverse face 64 and the circumferential surface of the piston. In other example, other arrangements of insulation may be provided.

In operation, the cold compressed first working fluid exiting the first volume 12 of the compression cylinder 10 flows through the cold-side heat exchanger 300 and removes heat from the second volume 14. This helps to maintain the temperature gradient across the second working fluid coupling 90 and, indirectly, helps to keep the first working volume 12 of the compression cylinder cold to facilitate efficient compression.

The temperature sensor 49 senses the temperature of the first working fluid exiting the recuperators 46, 48, i.e. exiting the outlet of the primary recuperator 46, and communicates the sensed temperature to the controller 200. The controller 200 compares the sensed temperature to a reference temperature. The reference temperature is a target temperature for the first working fluid being provided to the inlet port 70 of the expansion cylinder 50 and may be based on at least one of a property of the fuel, a property of the first working fluid, a dimension of the expansion cylinder and an operational parameter of the engine.

On start-up, when there is no hot exhaust product in the recuperators 46, 48, the controller 200 prevents the injection of coolant into the first working fluid 32 and controls the valve 43 to be open to allow the first working fluid to bypass the recuperators to avoid a temperature drop that might otherwise arise in passing through the recuperators. After a designated amount of time or engine cycles or based on a comparison between the sensed temperature and the reference temperature, the controller 200 allows the introduction of coolant into the compression cylinder and controls the valve 43 to close to shut the exhaust pathway 44 so that the first working fluid flows to the expansion cylinder 50 through the recuperators 48, 46.

The controller 200 controls the (exhaust) valve 83 based on a comparison of the sensed temperature to the reference temperature in order to maintain the output temperature of the first working fluid exiting the recuperators 48, 46 at or near the reference temperature. When the sensed temperature is below the reference temperature, the controller 200 controls the valve 83 to close or block the secondary exhaust path 84 so that all of the available exhaust product is directed through the primary recuperator 46 to maximizes the provision of heat to the primary recuperator 46. When the sensed temperature matches or exceeds the reference temperature, the controller 200 controls the valve 83 to unblock or open the secondary exhaust path 84 to allow at least a portion of the exhaust product to flow to the hot-side heat exchanger 400. This avoids overheating the first working fluid supplied to the expansion cylinder 50, and utilizes the excess heat of the waste product to maintain a high temperature in the second volume 54. From the hot-side heat exchanger 400, the exhaust product continues through the primary recuperator 48, where residual heat which was not transferred to the second volume 54 is provided to the first working fluid before it enters the primary recuperator 46.

When the reference temperature is matched or exceeded, the valve 83 may be controlled to allow a flow through both the primary and secondary exhaust pathways 82, 84 simultaneously or to alternately open and close them or, as another possibility, the open and close them with another phase difference.

FIG. 3 shows stages in an engine cycle at 90° intervals in an example in which the compression piston 20 and the expansion piston 60 are separated by a phase angle of 270° with the compression piston 20 leading. The position of the crank 100 is indicated on the left hand side.

Stage 2000 shows the compression piston 20 at its bottom most position within the compression cylinder 10, at its furthest distance from the compression cylinder ports 30, 32, 34. The compression cylinder first volume 12 is at its maximum and the compression cylinder second volume 14 is at its minimum. First working fluid has been admitted in the first volume 12 and coolant has been injected after the closure of the inlet port 30. The first volume 12 therefore contains first working fluid and coolant.

The expansion piston 60 has travelled to the midpoint of its traverse towards the expansion cylinder ports 70, 72, 74, ready for an expansion stroke. The expansion cylinder first volume 52 is at half its maximum volume and decreasing and the expansion cylinder second volume 54 is at half its maximum volume and increasing. The exhaust port 74 is open to allow the hot exhaust product to exit the first volume 52.

At stage 2000, the compression cylinder second volume 14 has reduced to its minimum, forcing second working fluid from the second volume into and though the second working fluid coupling 90. The flow towards the hot side is assisted by the increasing volume of the expansion cylinder second volume 54, which draws second working fluid into the second volume 54. As the second working fluid passes through the regenerator 92 from the cold side it picks up heat. The fluid may undergo constant-volume heat addition or approximately so. When the fluid exits the regenerator 92 into the hot side, the fluid expands into the lower pressure environment. The fluid may undergo isothermal expansion or approximately so. The expansion is further encouraged by the expanding volume on the hot side. The expanding second working fluid exerts a force on the reverse face 64 of the expansion piston 60, thereby providing a source of work which helps to move the expansion piston 60 to its top dead centre position ready for the expansion stroke.

Stage 2001 shows the compression piston 20 having moved to a midpoint of its path towards the compression cylinder ports 30, 32, 34, having completed half of its compression stroke. The compression cylinder first volume 12 is at half its maximum volume and decreasing and the compression cylinder second volume 14 is at half its maximum volume and increasing. During this stage (the compression stroke), the fluid in the compression cylinder first volume 12 is being approximately isothermally compressed as the coolant boils from its liquid phase to its gas phase by absorbing heat energy supplied to the contents of the first volume 12 by the working compression piston 20.

The expansion piston 60 has reached its top dead centre position, at its minimum separation from the expansion cylinder ports 70, 72, 74. The expansion cylinder first volume 54 is at its minimum and the expansion cylinder second volume 54 is at its maximum. First working fluid has been admitted into the first working volume 52 (as indicated by the arrow), the exhaust port 74 is closed and fuel is injected into the first volume 52. Combustion occurs.

There is no flow, or little flow, of second working fluid through the regenerator 92. The regenerator 92 is at its coldest point, having supplied its heat to second working fluid entering the hot side in the previous stage (see stage 1004). The net pressure of the second working fluid falls as the volume of the total second working fluid closed volume (comprising the two second volumes 14, 54 and the second working fluid coupling 90) is greater than in stage 2000.

Stage 2002 shows the compression piston 20 having moved to its topmost position nearest to the compression cylinder ports 30, 32, 34 at the completion of its compression stroke. The compression cylinder first volume 12 is at its maximum and the compression cylinder second volume 14 is at its minimum. The outlet port 34 has opened and the cold compressed first working fluid exits the compression cylinder 10 and enters to the first working fluid pathway 40 towards the heat exchangers for heating.

The expansion piston 60 has completed half of its expansion stroke, having been driven away from the expansion cylinder ports 70, 72, 74 by the force of the expanding combusting fluid in the expansion cylinder first volume 52. The expansion cylinder first volume 52 is at half its maximum volume and increasing and the expansion cylinder second volume 54 is at half its maximum volume and decreasing.

The decreasing volume of the expansion cylinder second volume 54 forces second working fluid out of the expansion cylinder second volume 54. Second working fluid is drawn from the hot side into the cold side. As the hot fluid from the hot expansion side passes through the regenerator 92, heat is removed from the fluid. The fluid may undergo constant-volume (isochoric) heat removal or approximately so. Due to the reduction in thermal energy, the fluid pressure is reduced as it enters the cold side. The reduction in pressure provides a source of work to the expansion piston 60.

Stage 2003 shows the compression piston 20 having moved back to the midpoint of its traverse away from the compression cylinder ports 30, 32, 34 towards the bottom of the compression cylinder 10, ready for the next compression stroke. The compression cylinder first volume 12 is at half its maximum volume and increasing and the compression cylinder second volume 14 is at half its maximum volume and decreasing. The inlet valve 30 is open and a fresh supply of second working fluid is admitted into the compression cylinder first volume 12 for the next compression stroke. The outlet port 34 is shut.

The expansion piston 60 has reached its bottom most position at it maximum separation from the expansion cylinder ports 70, 72, 74 at the completion of its expansion stroke. The expansion cylinder first volume 52 is at its minimum and the expansion cylinder second volume 54 is at its maximum.

There is no flow, or little flow, of second working fluid through the regenerator 92. The regenerator 92 is at its hottest point, having received the heat from second working fluid flowing from the hot side in the previous stage (stage 1004). Cooling of the second volume working gas and the resulting drop in pressure enables work to be extracted from the compressor cylinder via the downward motion of the piston 20. The decreasing volume of the compression cylinder second volume 14 forces second working fluid out of the second volume and into the second working fluid coupling towards the hot side. Between stages 2002 and 2003, the net volume of the second working fluid closed volume has been decreasing as both the compression and expansion pistons 10, 60 have been moving down the respective cylinders 10, 50 away from the respective ports.

The cycle repeats as indicated.

Other relative timings of engine operational steps, such phasings of the opening and closing of ports in the cylinders and timings of control operations may be possible. Other examples provide a different phase separation between the pistons than the examples described herein. On other possibilities, a phase separation of between 180° and 270° or between 270° and 360° may be provided. In general, the compression piston 20 is arranged to lead.

The invention claimed is:

1. A split-cycle engine, comprising:
 a compression cylinder, comprising:
  an inlet port for a first working fluid;
  a coolant admission port;
  an outlet port for the first working fluid and coolant; and
  a compression piston, having an obverse face and a reverse face, the compression piston being arranged within the compression cylinder such that the compression piston separates a first volume of the compression cylinder, the first volume for containing the first working fluid, from a second volume of the compression cylinder, the second volume for containing a second working fluid, the first volume being defined by the obverse face and an inner wall of the compression cylinder and including the ports, and the second volume being defined by the reverse face and the inner wall of the compression cylinder;
 an expansion cylinder, comprising:
  an inlet port for the first working fluid, the inlet port being arranged in fluidic communication with the compressor outlet port;
  a fuel admission port;
  an exhaust port for the exit of an exhaust product of combustion; and
  an expansion piston, having an obverse face and a reverse face, the expansion piston being arranged within the expansion cylinder such that the expansion piston separates a first volume of the expansion cylinder, the first volume for containing the first working fluid, from a second volume of the expansion cylinder, the second volume for containing second working fluid, the first volume being defined by the obverse face and an inner wall of the expansion cylinder and including the ports, and the second volume being defined by the reverse face and the inner wall of the expansion cylinder; and a fluid coupling between the second volume of the compression cylinder and the second volume of the expansion cylinder, wherein the two second volumes and the fluid coupling provide a closed volume for the second working fluid, wherein the fluid coupling comprises a regenerator arranged such that the two second volumes are thermally decoupled.

2. The split cycle engine of claim 1, wherein the regenerator is arranged to allow the flow of the second fluid between the two second volumes whilst limiting the transfer of heat from the hot expansion side of the fluid coupling to the cold compression side of the fluid coupling.

3. The split cycle engine of claim 1, wherein the expansion cylinder is provided with a thermal jacket to reduce heat loss from the expansion cylinder.

4. The split cycle engine of claim 3, comprising means for regulating the temperature of the thermal jacket to maintain the temperature on an inner surface of the expansion cylinder at or near a target temperature.

5. The split cycle engine of claim 1, wherein the exhaust port of the expansion cylinder is fluidically coupled, via an exhaust coupling, to a recuperator of the engine, the recuperator being arranged to thermally couple first working fluid from the compression cylinder to hot exhaust gases from the expansion cylinder to transfer heat in the exhaust product to the first working fluid.

6. The split cycle engine of claim 5, wherein the exhaust coupling is a primary exhaust coupling and the recuperator is a primary recuperator and wherein the exhaust port of the expansion cylinder is fluidically coupled, via a secondary exhaust coupling, to a hot-side heat exchanger arranged in thermal communication with the second volume of the expansion cylinder to transfer heat in the exhaust product to second working fluid in the second volume, optionally comprising means for controlling the flow of the exhaust product to the primary recuperator and/or the hot-side heat exchanger, optionally wherein the means for controlling the flow of the exhaust product comprises a valve arranged to be operated by a controller of the engine, optionally wherein the controller is configured to control the valve based on a sensed temperature in the engine, optionally wherein the sensed temperature is a temperature of the expansion side of the primary recuperator, optionally wherein the controller is configured to control the valve to allow a flow of the exhaust product through the primary exhaust coupling and to restrict flow through the secondary coupling when the sensed temperature is below a reference temperature, optionally wherein the controller is configured to control the valve to allow a flow of the exhaust product through the primary exhaust coupling and a flow through the secondary coupling when the sensed temperature is above a reference temperature.

7. The split cycle engine of claim 6, wherein an outlet of the hot-side heat exchanger is fluidically coupled to a secondary recuperator, arranged between the compressor cylinder outlet port and the primary recuperator to couple residual heat in the exhaust product to the first working fluid before the first working fluid passes through the primary recuperator.

8. The split cycle engine of claim 5, comprising a bypass coupling to fluidically couple the outlet port of the compression cylinder to the inlet port of the expansion cylinder without passing through the recuperator.

9. The split cycle engine of claim 5, comprising means for controlling the flow of the first working fluid through the bypass coupling and/or through the recuperator.

10. The split cycle engine of claim 1, wherein the compression cylinder comprises a thermal jacket to reduce heating of the compression cylinder.

11. The split cycle engine of claim 10, comprising means for regulating the temperature of the thermal jacket to maintain the temperature on an inner surface of the expansion cylinder at or near a target temperature.

12. The split cycle engine of claim 1, comprising a cold-side heat exchanger arranged in thermal communication with the second volume of the compression cylinder to remove heat from the second volume.

13. The split cycle engine of claim 12, wherein the cold-side heat exchanger is arranged to receive first working fluid from the outlet port of the compression cylinder.

14. The split cycle engine of claim 12, wherein the cold-side heat exchanger is arranged to receive coolant from a coolant reservoir.

15. The split cycle engine of claim 1, wherein the split cycle engine comprises means for maintaining the coolant, which is a gas at room temperature and pressure, in a liquid state prior to injection into the first volume of the compression cylinder.

16. The split cycle engine of claim 1, wherein the compression piston and the expansion piston are phased such that work is generated in the second working fluid in response to the movement of the pistons such that the work assists the movement of the pistons.

17. The split cycle engine of claim 1, wherein the compression piston and the expansion piston are mechanically coupled so as to define a phase relationship of 270° between the pistons with the compression piston leading.

18. The split cycle engine of claim 1, wherein the compression piston and the expansion piston are mechanically coupled so as to define a phase relationship of between 180° and 270° between the pistons with the compression piston leading.

19. The split cycle engine of claim 1, wherein the compression piston and the expansion piston are mechanically coupled so as to define a phase relationship of between 270° and 360° between the pistons with the compression piston leading.

20. The split cycle engine of claim 1, wherein the compression piston and the expansion piston are arranged to be mechanically coupled by a mechanical coupling which permits variation of the phase relationship between the pistons.

* * * * *